United States Patent
Zhan

(10) Patent No.: US 11,789,491 B2
(45) Date of Patent: Oct. 17, 2023

(54) METHOD FOR DETECTING FOREIGN OBJECT AND RELATED ELECTRONIC DEVICES

(71) Applicant: GUANGDONG OPPO MOBILE TELECOMMUNICATIONS CORP., LTD., Guangdong (CN)

(72) Inventor: Wenxi Zhan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 212 days.

(21) Appl. No.: 17/409,310

(22) Filed: Aug. 23, 2021

(65) Prior Publication Data

US 2021/0383112 A1    Dec. 9, 2021

Related U.S. Application Data

(63) Continuation of application No. PCT/CN2020/079415, filed on Mar. 15, 2020.

(30) Foreign Application Priority Data

Mar. 15, 2019    (CN) .......................... 201910198744.1

(51) Int. Cl.
*G06F 1/16* (2006.01)
*G06T 7/73* (2017.01)
(Continued)

(52) U.S. Cl.
CPC .......... *G06F 1/1616* (2013.01); *G06F 1/1641* (2013.01); *G06F 18/213* (2023.01);
(Continued)

(58) Field of Classification Search
CPC .... G06F 1/1616; G06F 1/1641; G06F 18/213; G06F 1/1652; G06F 1/1677; G06F 1/1686; G06F 3/0304; G06F 3/0482; G06T 7/13; G06T 7/60; G06T 7/74; G06V 40/1318; G06V 10/82
See application file for complete search history.

(56) References Cited

U.S. PATENT DOCUMENTS

| | | | |
|---|---|---|---|
| 4,242,702 A | 12/1980 | Kuni et al. | |
| 2018/0096462 A1* | 4/2018 | Hightower | ........... G06V 30/347 |
| 2019/0251393 A1* | 8/2019 | Jiang | ................. G06V 40/1347 |

FOREIGN PATENT DOCUMENTS

| | | |
|---|---|---|
| CN | 1656372 A | 8/2005 |
| CN | 101001319 A | 7/2007 |

(Continued)

OTHER PUBLICATIONS

Machine translation for CN 106200047 (Year: 2016).*

(Continued)

*Primary Examiner* — Qian Yang
(74) *Attorney, Agent, or Firm* — Young Basile Hanlon & MacFarlane, P.C.

(57) ABSTRACT

A method for detecting a foreign object and related electronic devices are provided. The method is applied to an electronic device having a screen and an image sensor arranged below the screen. The image sensor captures a detection image. It is detected whether a foreign object is attached on the screen based on the detection image.

15 Claims, 4 Drawing Sheets

(51) Int. Cl.
*G06T 7/13* (2017.01)
*G06T 7/60* (2017.01)
*G06V 40/13* (2022.01)
*G06F 18/213* (2023.01)
*G06V 10/82* (2022.01)

(52) U.S. Cl.
CPC ............ *G06T 7/13* (2017.01); *G06T 7/60* (2013.01); *G06T 7/74* (2017.01); *G06V 40/1318* (2022.01); *G06V 10/82* (2022.01)

(56) References Cited

FOREIGN PATENT DOCUMENTS

| | | | |
|---|---|---|---|
| CN | 101155248 | A | 4/2008 |
| CN | 101600046 | A | 12/2009 |
| CN | 102782724 | A | 11/2012 |
| CN | 103645822 | A | 3/2014 |
| CN | 104077773 | A | 10/2014 |
| CN | 104359917 | A | 2/2015 |
| CN | 104509102 | A | 4/2015 |
| CN | 104809732 | A | 7/2015 |
| CN | 105973894 | A | 9/2016 |
| CN | 105973911 | A | 9/2016 |
| CN | 106200047 | * | 12/2016 |
| CN | 106973159 | A | 7/2017 |
| CN | 106973159 | B | 7/2017 |
| CN | 107016334 | A | 8/2017 |
| CN | 107626688 | A | 1/2018 |
| CN | 207115245 | U | 3/2018 |
| CN | 108288050 | A | 7/2018 |
| CN | 108318503 | A | 7/2018 |
| CN | 108827979 | A | 11/2018 |
| CN | 109062652 | A | 12/2018 |
| CN | 109100363 | A | 12/2018 |
| CN | 109241775 | A | 1/2019 |
| CN | 109884727 | A | 6/2019 |
| EP | 0576011 | A1 | 12/1993 |
| KR | 20130024501 | A | 3/2013 |
| KR | 101695563 | B1 | 1/2017 |

OTHER PUBLICATIONS

Extended European Search Report for Application 20772921.1 dated Feb. 18, 2022.
China Notice of Allowance with English Translation for Application No. 201910198744.1 dated Feb. 8, 2022.
Chinese First Office Action with English Translation for CN Application 201910198744.1 dated Jun. 2, 2020. (26 pages).
Chinese Second Office Action with English Translation for CN Application 201910198744.1 dated Jan. 26, 2021. (27 pages).
Chinese Third Office Action with English Translation for CN Application 201910198744.1 dated Aug. 2, 2021. (23 pages).
International Search Report with English Translation for International Application PCT/CN2020/079415 dated May 28, 2020. (20 pages).

* cited by examiner

METHOD FOR DETECTING FOREIGN OBJECT AND RELATED ELECTRONIC DEVICES

CROSS-REFERENCE TO RELATED APPLICATION(S)

The disclosure is a continuation application of International Application No. PCT/CN2020/079415, filed on Mar. 15, 2020, which claims priority to Chinese Patent Application No. 201910198744.1, filed on Mar. 15, 2019, the entire contents of both of which are incorporated herein by reference.

TECHNICAL FIELD

The disclosure relates to a field of electronic device technologies, and particularly to a method and an apparatus for detecting a foreign object, and an electronic device.

BACKGROUND

With the constant development of terminal technologies, electronic devices (smart phone, tablet computer, etc.) are increasingly popular. When a user uses an electronic device with a touch screen, a foreign object may be attached on the screen.

SUMMARY

A method for detecting a foreign object is provided. In one embodiment, the method is applied to an electronic device with a screen and an image sensor arranged below the screen. The method includes: acquiring a detection image captured by an image sensor; and detecting whether a foreign object is attached on the screen based on the detection image.

An electronic device is provided. In one embodiment, the electronic device includes a screen and an image sensor arranged below the screen. The electronic device further includes a memory, a processor and a computer program stored on the memory and executable on the processor. The processor is electrically connected to the image sensor and the screen. The processor is configured to run the computer program to execute the method for detecting a foreign object as described above.

Another electronic device is provided. In one embodiment, the electronic device includes a foldable screen and an image sensor arranged below the screen. The screen includes a first display region and a second display region. The first display region and the second display region are rotatable with respect to each other. The first display region faces towards the second display region when the electronic device is in a folding state. The electronic device further includes a memory, a processor and a computer program stored on the memory and executable by the processor. The processor is electrically connected to the image sensor and the screen. The processor is configured to run the computer program to execute a method for detecting a foreign object as described above.

Additional aspects and advantages of the disclosure will be set forth in part in the following description, and in part will become obvious from the following description, or may be learned by practice of the disclosure.

BRIEF DESCRIPTION OF DRAWINGS

The above and/or additional aspects and advantages of the disclosure will become obvious and easy to understand from the following description of the embodiments in conjunction with the accompanying drawings, in which.

DETAILED DESCRIPTION

Embodiments of the disclosure will be described in detail below, and examples of embodiments are illustrated in the accompanying drawings, in which the same or similar labels represent the same or similar elements or elements with the same or similar functions. The embodiments described below with reference to the drawings are exemplary, are intended to explain the disclosure and are not to be construed as a limitation of the disclosure.

During a process of using an electronic device, a foreign object can be attached on screen of the electronic device. The foreign object may cause inconvenience for use, affect sensitivity of the screen and damage the screen.

In view of this, embodiments of the disclosure provide a method for detecting a foreign object and related electronic devices, which will be described below with reference to the accompanying drawings.

Figure 1:
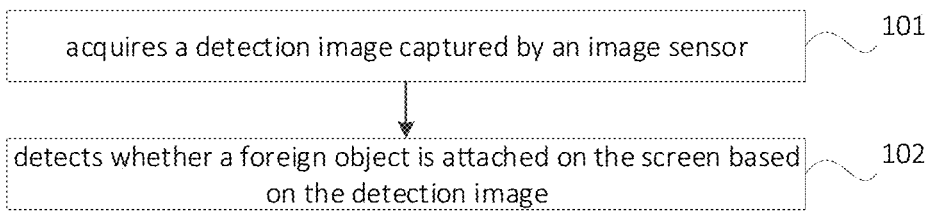
FIG. 1 is a flowchart illustrating a method for detecting a foreign object according to a first embodiment of the disclosure.

FIG. 1 is a flowchart illustrating a method for detecting a foreign object according to a first embodiment of the disclosure.

In embodiments of the disclosure, as an example, the method for detecting a foreign object is applied to an apparatus for detecting a foreign object. The apparatus for detecting a foreign object may be applied to an electronic device to allow the electronic device to execute a function of foreign object detection.

With the method for detecting a foreign object, it can be detected whether a foreign object is attached to the screen of the electronic device. The foreign object may be an object attached on the screen such as rubber debris, bread residue, and gravel.

It is to be understood that, the foreign object attached on the screen refers to the foreign object attached on an outer surface of the screen, an inner surface of the screen or both the outer and inner surfaces. The outer surface faces towards users, and the inner surface is opposite to the outer surface and faces away from the users.

In some embodiments, it may be detected in real time whether there is a foreign subject on the screen of electronic device during the use of electronic device.

In some embodiments, it may be detected periodically whether there is a foreign subject on the screen of electronic device during the use of electronic device, to improve an endurance capability of electronic device.

In some embodiments, for an electronic device with a foldable screen, that is, a foldable electronic device, it may be detected whether a foreign object is attached to the screen of the electronic device when the screen is in an unfolding state and a folding state to avoid the screen from being damaged.

The electronic device may be a personal computer (PC), a cloud device, a mobile device, and the like. The mobile terminal may be a mobile phone, a tablet computer, a personal digital assistant, a wearable device and other hardware devices with various operating systems, touch screens, and/or display screens.

As illustrated in FIG. 1, the method for detecting a foreign object includes the following.

At block 101, a detection image captured by an image sensor is acquired.

In embodiments of the disclosure, an image sensor may be provided below a screen of an electronic device, or an image sensor may be integrated in the screen of the electronic device. The image sensor may be such as a charge coupled device (CCD), a complementary metal oxide semiconductor (CMOS), a thin film transistor (TFT), etc., which is not limited here.

In some embodiments, the detection image may be captured by the image sensor in real time during the use of electronic device to avoid the screen from being damaged or crushed.

In some embodiments, the detection image may be captured by the image sensor periodically during the use of electronic device, to improve the endurance ability of the electronic device.

In some embodiments, during the use of electronic device, the detection image may be captured when a preset condition is met, to meet personalized requirements of users.

For example, the user can use a foldable electronic device. While the user is folding the screen, that is, when the screen is in the folding state, the detection image may be captured by the image sensor to avoid the screen from being damaged. In other words, the preset condition may be the screen being in the folding state.

It is to be understood that, the preset condition may be others, for example, when the user turns on an electronic device, during the use of electronic device by the user, etc., which is not limited here.

In embodiments of the disclosure, after the detection image is captured by the image sensor, the apparatus for detecting a foreign object according to embodiments of the disclosure may acquire the detection image captured by the image sensor.

At block 102, it is detected whether there is a foreign object on the screen based on the detection image.

It may be understood that, when there is a foreign object on the screen, the screen will have a corresponding representation, and this representation will be reflected in the detection image. For example, when rubber debris are attached on the screen within a certain region, this region of the screen is covered by the rubber debris, and brightness of pixels in the certain region is different from that of a remaining of the detection image captured by the image sensor. A contour of this certain region is similar to the contour of the rubber debris attached on the screen. Therefore, in the disclosure, it may be detected whether a foreign object is attached on the screen based on the detection image. For example, it can be detected whether a foreign object is on the screen by comparing brightness of each pixel in the detection image. Therefore, it may be recognized whether a foreign object is attached on a screen, such that the foreign object may be removed in time to avoid the screen from being damaged.

As an example, for any electronic device or for a foldable electronic device, during the use of the electronic device by the user, it may be detected whether a foreign object is attached on the screen by an image sensor provided below the screen. Therefore, when there is a foreign object on the screen, the user can be prompted to remove the foreign object in time to avoid the screen from being damaged.

With the method for detecting a foreign object according to embodiments of the disclosure, it is detected whether there is a foreign object on the screen based on the detection image captured by the image sensor. Therefore, it may be recognized whether a foreign object is attached on a screen, such that the foreign object may be removed in time by the user to avoid the screen from being damaged.

At present, the convenience and visual experience of the electronic device are factors to attract users. It has become a difficult problem for manufacturers to be solved how to improve the visual impact of the electronic device to attract more users without significantly increasing the appearance or the dimension of the electronic device.

In related art, a proportion of an area of a display screen to an area of a front surface may be improved by continuously reducing peripheral borders of the electronic device, or the visual experience of a larger screen may be achieved through a foldable screen. The foldable screen may be folded and unfolded by means of the shaft. However, the applicant found that: since the foldable screen is easily damaged by an external force, while the screen is being folded, in cases that a foreign object is attached on the screen, the screen is easily damaged.

In the method for detecting a foreign object according to embodiments of the disclosure, it can be exactly recognized whether a foreign object is attached on the screen of a foldable electronic device based on the detection image. The screen includes a first display region and a second display region, where the first region and the second display region are rotatable with respect to each other. When the electronic device is in the folding state, the first display region faces towards the second display region.

In detail, a foreign object being attached on the screen, includes following cases. There is a foreign object on the first display region there is a foreign object on the second display region, there is a foreign object on an overlapping portion between the first display region and the second display region, there is a foreign object on the first display region and the second display region, there is a foreign object on the first display region and an overlapping portion between the first display region and the second display region, there is a foreign object on the second display region and an overlapping portion between the first display region and the second display region, or there is a foreign object on the first display region, the second display region and the overlapping portion between of the first display region and the second display region. The screen region that is attached with the foreign object will have a corresponding representation. The corresponding representation may be reflected on a detection image. Therefore, it may be detected whether a foreign object is attached on the screen based on the detection image in the disclosure. The above process will be described in detail in combination with FIG. 2.

Figure 2:
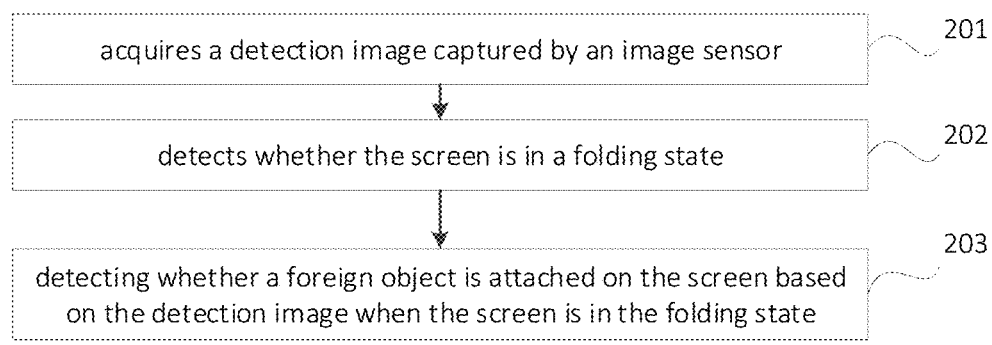
FIG. 2 is a flowchart illustrating a method for detecting a foreign object according to a second embodiment of the disclosure.

FIG. 2 is a flowchart illustrating a method for detecting a foreign object according to a second embodiment of the disclosure.

As illustrated in FIG. 2, the method for detecting a foreign object includes the following.

At block 201, a detection image captured by an image sensor is acquired.

At block 202, it is detected whether the screen is in a folding state.

In embodiments of the disclosure, when the screen is in the folding state, the first display region of the screen faces towards the second display region of the screen.

It is to be noted that the disclosure only takes two display regions as an example. In practical applications, the screen can include more than two display regions. For example, a case where the screen includes three display regions is taken as an example. When the screen is in the folding state, a first display region of the screen faces towards the second display region of the screen, and the third display region of the screen faces away from the second display region of the screen. As another example, the first display region of the screen faces away from the second display region of the screen, and the third display region of the screen faces towards the second display region of the screen.

It may be appreciated by those skilled in the art that, inwards folding implementation of more display regions of the screen can be inferred based on the above implementations, which are not listed here.

In embodiments of the disclosure, it may be determined whether the screen is in the folding state based on an included angle between the first display region and the second display region. When the included angle between the first display region and the second display region is decreasing, it indicates that the screen is in the folding state. In this case, a block 203 is executed. When the included angle between the first display region and the second display region is kept unchanged, the screen is not in the folding state. When the included angle between the first display region and the second display region is increasing, it indicates that the screen is in the unfolding state.

It is to be noted that, when the screen is not in the folding state or when the screen is in the unfolding state, it is possible to perform no processing. In another example, in order to monitor the screen in real time to avoid the screen from being damaged by the foreign object, when the screen is not in the folding state or when the screen is in the unfolding state, the image sensor can be used to detect whether a foreign object is attached to the screen. When it is detected that a foreign object is attached to the screen, prompt information can be provided to the user in a form of text, graph, voice broadcast, alarm sound, vibration or light, to prompt the user, thereby preventing the foreign object from damaging the screen.

Certainly, an auxiliary display screen can be provided at an outside side of the electronic device opposite to the first display region of the screen. The auxiliary display screen can be configured to display when the screen is in an inwards folding state. As another example, the auxiliary display screen can be provided at the outside side of the electronic device opposite to the second display region of the screen. As another example, auxiliary display screens can be provided at both the outside side of the electronic device opposite to the first display region of the screen and the outside side of the electronic device opposite to the second display region of the screen, which is not limited here. For the screen having a foreign object attached thereon, the above-mentioned "screen" does not refer to the auxiliary display screen, and the prompt information can be displayed on the auxiliary display screen.

In embodiments of the disclosure, a detection component may be provided in the electronic device. The detection component is configured to detect the included angle between the first display region and the second display region. A current included angle detected by the detection component at a current moment is compared with a previous included angle detected at a previous moment. When the current included angle detected at the current moment is smaller than the previous included angle detected at the previous moment, it is determined that the included angle is decreasing. In this case, it may be determined that the screen is in the folding state.

In at least one embodiment, the detection component may measure a distance between the detection component and the first display region or the second display region, and determine the included angle between the first display region and the second display region based on position information of the detection component and the distance.

In some embodiments, the detection component may be an angle-detection-related sensor, such as Hall sensor. The included angle between the first display region and the second display region may be detected directly through the related sensor.

It is to be understood that it can be detected whether the screen is in the folding state directly through the related sensor such as infrared sensor, which is not limited in the disclosure.

At block 203, it is detected whether a foreign object is attached to the screen based on the detection image when the screen is in the folding state.

In detail, when a foreign object is attached to the screen, for example, there is a foreign object on the first display region, the second display region, and/or, an overlapping portion between the first display region and the second display region, the first display region, the second display region, and/or the overlapping portion between the first display region and the second display region will have a corresponding representation, which may be reflected in the detection image. Therefore, in the disclosure, when the screen is in the folding state, in order to avoid the screen from being damaged by the foreign object, it may be detected whether a foreign object is attached on the screen based on the detection image.

It is to be noted that, generally there is a limited duration when the screen is folded by the user. When the screen is in the folding state, only the foreign object attached on the overlapping portion between the first display region and the second display region may increase a probability of damaging the screen. Therefore, in order to improve efficiency of image recognition and improve efficiency of foreign object detection, in the disclosure, when the screen is in the folding state, it can be detected whether a foreign object is on the overlapping portion between the first display region and the second display region based on the detection image. Therefore, when the screen is in the folding state, the efficiency of the foreign object detection may be improved.

In embodiments of the disclosure, an under-screen fingerprint module can be provided within a part of the first display region that is overlapped with the second display region when the electronic device is folded and/or provided within a part of the second display region that is overlapped with the first display region when the electronic device is folded. Thus, the detection image corresponding to the overlapping portion between the first display region and the second display region can be directly captured by a fingerprint image sensor of the under-screen fingerprint module. In order to obtain an entire image of the overlapping portion between the first display region and the second display region, in the disclosure, the under-screen fingerprint module can be a full-screen fingerprint module or a regional fingerprint module.

As an example, for the foldable electronic device, during the use of the electronic device by the user, it may be detected whether a foreign object is attached to the screen through an image sensor arranged below the screen. Therefore, when a foreign object is attached to the screen, the user may be prompted to remove the foreign object in time to avoid the screen from being damaged.

With the method for detecting a foreign object according to embodiments of the disclosure, it can be detected whether a foreign object is attached to the screen based on the detection image when the screen is in the folding state. Therefore, when the screen is in the folding state, it may be recognized whether there is a foreign object on the screen, such that the foreign object can be removed in time by the user to avoid the screen from being damaged.

Figure 3:
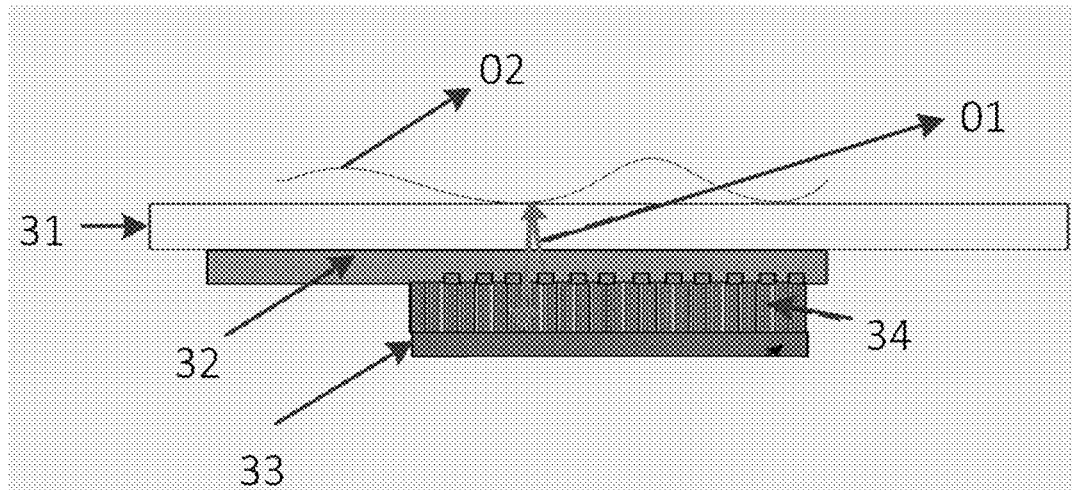
FIG. 3 is a schematic diagram illustrating a structure of an optical fingerprint module.

The method for detecting a foreign object according to embodiments of the disclosure can capture the detection image based on the full-screen optical fingerprint model or the regional optical fingerprint model. For example, as illustrated in FIG. 3, the optical fingerprint module may include a cover glass 31, a touch pad and a screen 32, a fingerprint image sensor 33, and an Olens 34. By introducing the Olens 34, an effective recognition area of screen fingerprints may be enlarged. The basic working principle of the optical fingerprint module may be as follows. The screen of the electronic device emits light 01. The light 01 is reflected by superficial textures of a finger 02 of the user to cause a difference which can be imaged through an under-screen fingerprint image sensor 33. Therefore, it can be determined whether there is a foreign object on the screen based on the detection image captured by the fingerprint image sensor 33.

It is to be understood that, it may be determined whether a foreign object is attached to the screen based on an ultrasound fingerprint module or a capacitive fingerprint module, which is not limited here.

Therefore, in embodiments of the disclosure, the electronic device may include an under-screen fingerprint module. The under-screen fingerprint module may include a fingerprint image sensor. The above-mentioned image sensor may refer to the fingerprint image sensor. For the block 201, the detection image may be captured by the fingerprint image sensor in the under-screen fingerprint module. Therefore, the apparatus for detecting a foreign object according to the disclosure can obtain a corresponding detection image from the under-screen fingerprint module. Accordingly, foreign object detection may be performed directly by the under-screen fingerprint module without adding an additional sensor, which may reduce the manufacture cost of the electronic device.

In embodiments of the disclosure, the under-screen fingerprint module may be used to scan and detect whether a foreign object is attached on the screen. When a foreign object is attached on the screen, for example, there is a foreign object on the first display region, the second display region, and/or, the overlapping portion between the first display region and the second display region, brightness of pixels within a pixel region corresponding to the foreign object in the detection image captured by the under-screen fingerprint module is different from the brightness of pixels in other regions.

Figure 4:
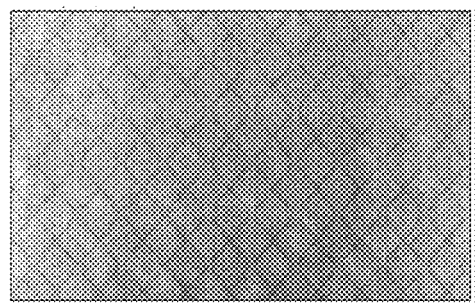
FIG. 4 is a first schematic diagram illustrating a detection image according to embodiments of the disclosure.

As an example, as illustrated in FIG. 4, when there is no foreign object on the screen, only grid textures (due to wiring of the touch screen and an opening of Olens) are present on the detection image captured by the under-screen fingerprint module. When a foreign object is attached to the screen, for example, a rubber block is attached on the screen, as illustrated in FIG. 5, the brightness of pixels within the pixel region corresponding to the rubber block in the detection image captured by the under-screen fingerprint module is different from the brightness of the pixels of other regions.

Therefore, in embodiments of the disclosure, it may be detected whether a foreign object is attached to the screen based on the detection image captured by the under-screen fingerprint module. Therefore, it may be recognized whether a foreign object is attached on a screen, such that the foreign object may be timely removed by the user to avoid the screen from being damaged.

As an example, for any electronic device or for a foldable electronic device, during the use of the electronic device by the user, it may be detected whether a foreign object is attached on the screen by the fingerprint image sensor in the under-screen fingerprint module. Therefore, when there is a foreign object attached on a screen, the user can be prompted so that the foreign object may be removed in time by the user to avoid the screen from being damaged.

Figure 5:
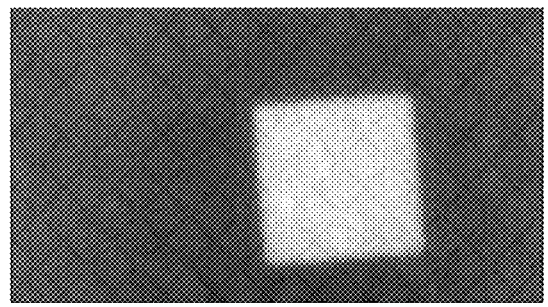
FIG. 5 is a second schematic diagram illustrating a detection image according to embodiments of the disclosure.

It may be understood that, when the foreign object is small, for example, as illustrated in FIG. 5, when the foreign object is completely located on the screen, the detection image may include a bright region and a dark region, and a boundary between the bright region and the dark region is closed to obtain a closed region. When the foreign object is not completely located on the screen, for example, only a part of the foreign object is on the screen, the detection image can include a bright region and a dark region, and two endpoints of the boundary between the bright region and the dark region are at the edge of the detection image. Therefore, in the disclosure, when the foreign object is smaller than the screen and completely located on the screen, or the foreign object is not completely located on the screen, it may be determined whether a foreign object is attached on the screen based on the bright region and the dark region in the detection image. Further, a specific position and a shape of the foreign object may be determined based on the boundary between the bright region and the dark region. The above process will be described in detail in combination with FIG. 6.

Figure 6:
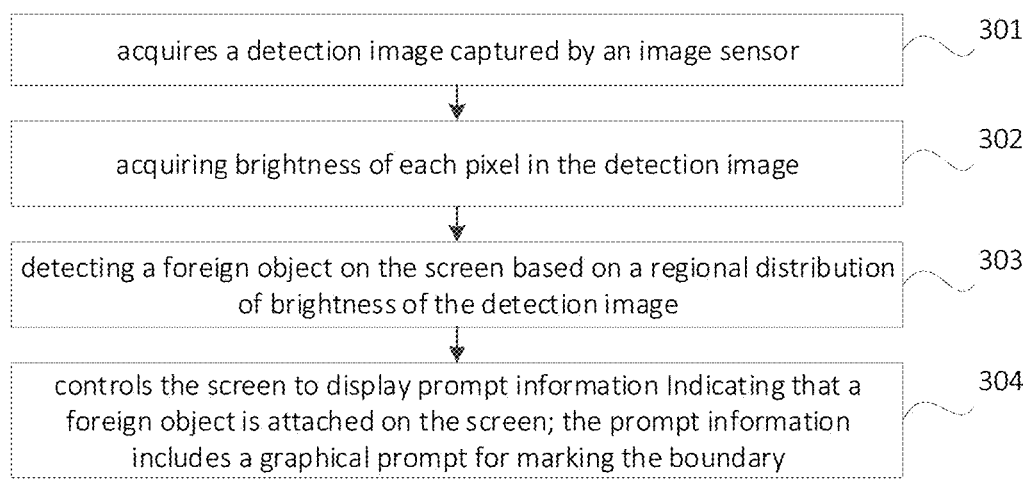
FIG. 6 is a flowchart illustrating a method for detecting a foreign object according to a third embodiment of the disclosure.

FIG. 6 is a flowchart illustrating a method for detecting a foreign object according to a third embodiment of the disclosure.

As illustrated in FIG. 6, the method for detecting a foreign object includes the following.

At block 301, a detection image captured by an image sensor is acquired.

In embodiments of the disclosure, the image sensor may be any image sensor in the related art, for example, a CMOS image sensor, a CCD image sensor, or, may be a fingerprint image sensor in an under-screen fingerprint module, which is not limited here.

At block 302, brightness of each pixel contained in the detection image is acquired.

At block 303, a foreign object on the screen is detected based on a regional distribution of the brightness of pixels in the detection image.

For an image, each pixel in the image has its corresponding brightness. Therefore, in embodiments of the disclosure, the brightness of each pixel in the detection image may be acquired, and a foreign object on the screen can be detected based on the brightness distribution of the detection image. For example, when a brightness difference between the brightness of pixels within a certain region of the detection image and the brightness of pixels within other regions is greater than a preset value, it may be determined that a foreign object is attached on the screen. When the brightness difference corresponding to each pixel within the detection image does not exceed the preset value, it may be determined that there is no foreign object on the screen.

Further, for detecting a foreign object on the screen based on the regional distribution of brightness of the detection image, a boundary between the bright region and the dark region in the detection image may be identified. The brightness of the bright region is higher than the brightness of the dark region. A shape of the foreign object and/or a position of the foreign object on the screen is determined based on a closed region that is enclosed though the boundary, and/or one or more edge of the detection image where the two endpoints of the boundary are located.

In embodiments of the disclosure, the boundary between the bright region and the dark region may be identified based on the brightness of each pixel of the detection image. In detail, the brightness of each pixel in the detection image may be compared with the brightness of corresponding adjacent pixels, and it is determined whether the brightness difference between the pixel and at least one adjacent pixel is greater than a threshold. When the brightness difference between the pixel and the at least one adjacent pixel is greater than the threshold, the pixel is marked as a target pixel, and every two adjacent target pixels can be connected by lines to obtain the boundary.

The threshold can be set in advance. For example, the threshold may be preset by a built-in program of the electronic device, or the threshold may be set by the user, which is not be limited here. The adjacent two target pixels are not necessarily spatial adjacent to each other.

It is to be noted that, when there is a foreign object on the screen, the bright region and the dark region in the detection image are related to the material of the foreign object. When the foreign object is reflective to light, the region corresponding to the foreign object in the detection image is the bright region. When the foreign object absorbs light, the region corresponding to the foreign object in the detection image is the dark region.

It may be understood that, as illustrated in FIG. 5, when the foreign object is completely located on the screen, a closed region is enclosed by the boundary between the bright region and the dark region. When the foreign object is not completely located on the screen, for example, only a part the foreign object is on the screen, the two endpoints of the boundary between the bright region and the dark region are at the edge of the detection image.

Therefore, in embodiments of the disclosure, by identifying the boundary between the bright region and the dark region in the detection image, where the brightness of the bright region is higher than the brightness of the dark region, the shape of the foreign object and/or the position of the foreign object on the screen is determined based on the closed region enclosed by the boundary and/or two endpoints of the boundary being located at the edge of the detection image. Not only it can be determined that the foreign object is attached on the screen to achieve precise foreign object detection on the screen, but also the position, shape and size of the foreign object can be determined to help the user to locate and remove the foreign object.

Further, after it is determined that a foreign object is attached to the screen, the screen can be controlled to display the prompt information indicating that a foreign object is attached on the screen.

At block 304, the screen is controlled to display prompt information indicating that a foreign object is attached on the screen. The prompt information includes a graphical prompt for marking the boundary.

In embodiments of the disclosure, for any electronic device or for a foldable electronic device, when there is a foreign object on the screen, the specific position information of the foreign object may be determined based on the boundary, and a shape of a downward projection of the foreign object may be determined. Therefore, when there is a foreign object on the screen, the screen can be controlled to display the prompt information indicating that a foreign object is attached on the screen. The prompt information includes a graphical prompt for marking the boundary, such that the specific shape of the foreign object may be determined to facilitate the user to find and remove the foreign object.

It is to be noted that, for a foldable electronic device, when the screen is folded, the user cannot see the prompt information displayed on the screen. In this case, when it is detected that a foreign object is attached on the screen, the auxiliary display screen can be controlled to display the prompt information indicating that there is a foreign object on the screen.

It is to be understood that, prompt information can be provided to the user in the form of text, graph, voice broadcast, alarm sound, vibration or light, to inform the user, which is not limited in embodiments of the disclosure. Therefore, the above prompt information may be displayed in many ways such that the user can get the prompt information in time and the foreign object may be removed in time.

In practical applications, it is possible that small and light foreign objects such as dust, scurf and hair may be on the screen of the electronic device. The size and weight of these foreign objects may be ignored, and these foreign objects may not damage the screen. Therefore, in the disclosure, only when the volume of the foreign object is greater than a certain degree, the screen is controlled to display the prompt information indicating that there is a foreign object on the screen.

In detail, in a case where the boundary is closed to enclose a first closed region, an area of the first closed region is determined, and/or, in a case where a second closed region is formed through the boundary and one or more edges of the image, an area of the second closed region is determined. It is determined whether the area of the first closed region or the area of the second closed region is greater than an area threshold. When the area of the first closed area or the area of the second closed region is greater than the area threshold, the screen is controlled to display the prompt information indicating that a foreign object is attached on the screen. When the area of the first closed region or the area of the second closed region is smaller than or equal to the area threshold, no processing is performed. The area threshold is set in advance. Thus, only when the volume of the foreign object is greater than a certain degree, the screen is controlled to display the prompt information indicating that there is a foreign object on the screen. In this case, the small or light foreign object can be identified to avoid frequent interruptions to the user.

As an example, when the foreign object is completely located on the screen, the first closed region is enclosed by the boundary between the bright region and the dark region. When the area of the first closed region is greater than the preset area threshold, the prompt information may be provided to the user. Therefore, the user can remove the foreign object on the screen.

As another example, when the foreign object is at the edge of the screen, for example, only half of the foreign object is on the screen, the second closed region is enclosed by the boundary between the bright region and the dark region as well as one or more edges of the image. When the area of the second closed region is greater than the preset area threshold, the prompt information may be provided to the user. Therefore, the user can remove the foreign object at the edge of the screen.

As another example, when multiple foreign objects are attached on the screen, for example at least one foreign object is completely on the screen and at least one foreign object is at the edge of the screen, it may be determined whether the area of the first closed region or the area of the second closed region is greater than the area threshold. When the area of the first closed region or the area of the second closed region is greater than the area threshold, the screen can be controlled to display the prompt information indicating that there is a foreign object on the screen. Therefore, the user can remove the foreign object on the screen and the foreign object at the edge of the screen.

With the method for detecting a foreign object according to embodiments of the disclosure, by detecting the brightness of each pixel contained in the detection image, a screen foreign object can be detected based on the regional distribution of brightness of the detection image. Thus, the foreign object on the screen may be detected based on the distribution of brightness of the detection image, to precisely detect whether there is a foreign object on the screen.

It may be understood that, when a foreign object is attached on the screen, regardless of the volume or the size of the foreign object, the image captured by the image sensor is different from a corresponding one captured when there is no foreign object on the screen. Therefore, in the disclosure, a reference image can be captured by the image sensor in advance when there is no foreign object on the screen. After the detection image is obtained, the detection image can be compared with the reference image to determine whether a foreign object is attached on the screen. The above process will be described in detail in combination with FIG. 7.

Figure 7:
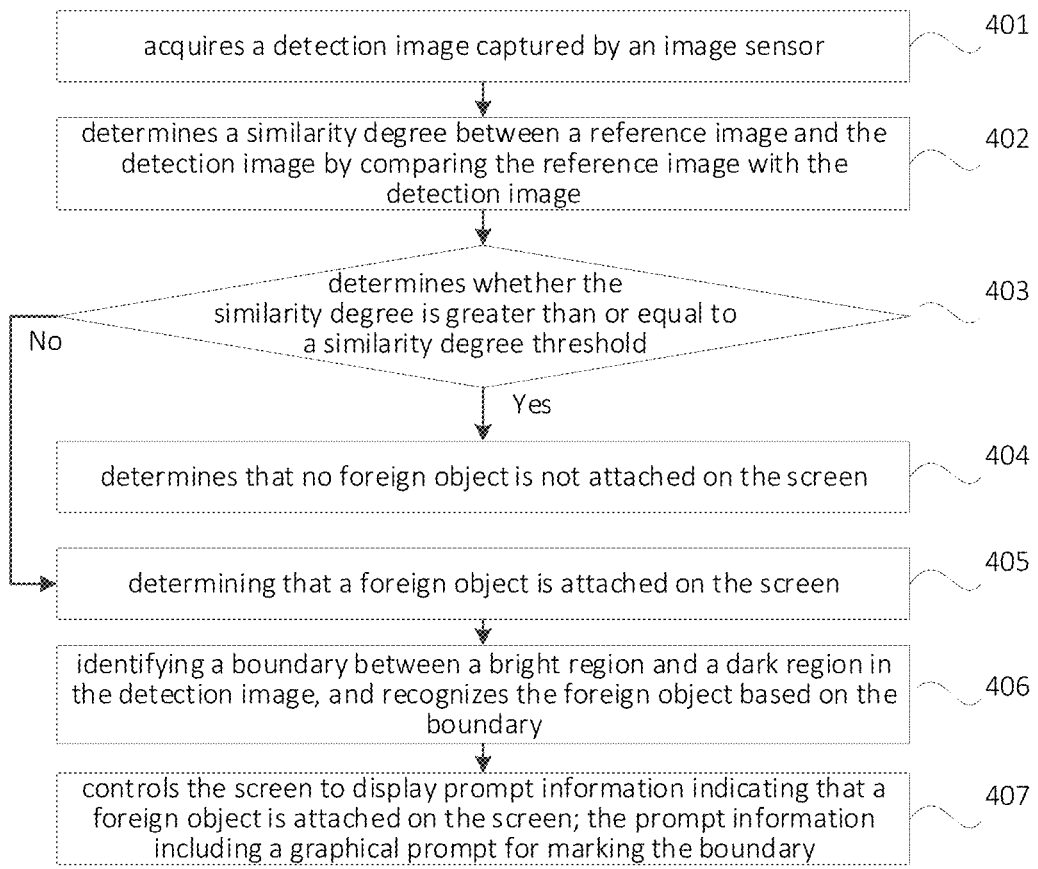
FIG. 7 is a flowchart illustrating a method for detecting a foreign object according to a fourth embodiment of the present disclosure.

FIG. 7 is a flowchart illustrating a method for detecting a foreign object according to a fourth embodiment of the disclosure.

As illustrated in FIG. 7, the method for detecting a foreign object includes the following.

At block 401, a detection image captured by an image sensor is acquired.

In embodiments of the disclosure, the image sensor may be any image sensor in the related art, or may be a fingerprint image sensor in the under-screen fingerprint module, which is not limited here.

At block 402, the detection image is compared with a reference image to determine a similarity degree between the reference image and the detection image.

In embodiments of the disclosure, the reference image is captured by the image sensor when there is no foreign object on the screen.

For example, the reference image is illustrated in FIG. 4.

At block 403, it is determined whether the similarity degree is greater than or equal to a similarity degree threshold. When the similarity degree is greater than or equal to the similarity degree threshold, a block 404 is executed. When the similarity degree is less than the similarity degree threshold, a block 405 is executed.

In embodiments of the disclosure, a first image feature of the reference image and a second image feature of the detection image may be extracted. The similarity degree between the reference image and the detection image is calculated based on the extracted first image feature and extracted second image feature. The image feature includes a contour feature and/or a color distribution. The color distribution indicates a correspondence between colors and image positions. For example, the contour feature may be determined through image processing technology based on deep learning. The color distribution may be determined based on a color histogram feature matching algorithm, a Color Moment algorithm or a color aggregation vector algorithm.

In detail, the similarity degree between the image feature of the reference image and the image feature of the detection image can be determined through a similarity degree calculation method in the related art. It is determined whether the calculated similarity degree is greater than or equal to a similarity degree threshold. When the calculated similarity degree is greater than or equal to the similarity degree threshold, it is determined that the reference image is similar to the detection image. In this case, a block 404 is executed. When the calculated similarity degree is less than the similarity degree threshold, it is determined that the reference image is not similar to the detection image. In this case, a block 405 is executed. The similarity degree threshold may be set in advance, for example, 95%.

At block 404, it is determined that there is no foreign object attached on the screen.

In embodiments of the disclosure, when the similarity degree between the reference image and the detection image is high, it may be determined that there is no foreign object on the screen. In this case, it is possible to perform no processing.

At block 405, it is determined that there is a foreign object attached on the screen.

In embodiments of the disclosure, when the similarity degree between the reference image and the detection image is low, it may be determined that there is a foreign object attached on the screen.

It may be understood that, there may be following situations when a foreign object is attached on the screen.

First situation, the foreign object is small and is completely on the screen. In this case, the boundary between the bright region and the dark region in the detection image may be identified, and the specific position, shape and size of the foreign object are determined based on the boundary to facilitate the user to remove the foreign object.

Second situation, the foreign object is not completely on the screen, for example, only a part of the foreign object is on the screen. In this case, the boundary between the bright region and the dark region in the detection image may be identified. Further, the specific position and shape of the foreign object can be determined based on the boundary to facilitate the user to remove the foreign object.

Third situation, the foreign object is large and covers the entirety of the screen. In this case, the detection image may include only the bright region or only the dark region, and thus no boundary between the bright region and the dark region exists. For example, when the foreign object is reflective to light, the detection image only includes the bright region. It can be precisely identified whether the reference image is similar to the detection image based on the color distribution included in the image feature of the detection image, to determine that there is no foreign object on the screen. The accuracy of detection result is improved.

In embodiments of the disclosure, for the first situation and/or the second situation, the specific position and shape of the foreign object may be further identified based on the block 406.

At block 406, the boundary between the bright region and the dark region in the detection image is identified, and the foreign object is recognized based on the boundary.

In embodiments of the disclosure, when the similarity degree between the reference image and the detection image is low, it may be determined that there is a foreign object on the screen. In this case, the boundary between the bright region and the dark region in the detection image can be used to determine a final position, shape and size of the foreign object. That is, the boundary between the bright region and the dark region in the detection image is identified, and when the closed region is enclosed by the boundary and/or two endpoints of the boundary are at the edge of the detection image, the final position, shape and size of the foreign object on the screen are determined. The execution process may refer to the execution process of blocks 302 to 303 in the above embodiments, which is not repeated here. Therefore, it may be accurately recognized whether a foreign object is attached on the screen, and the specific position and shape of the foreign object may be determined based on the boundary to facilitate the user to locate and remove the foreign object.

Further, after it is determined that there is a foreign object on a screen, the screen can be controlled to display the prompt information indicating that there is a foreign object on the screen.

At block 407, the screen is controlled to display prompt information indicating that a foreign object is attached on the screen. The prompt information includes a graphical prompt for marking the boundary.

The execution process of block 407 may refer to the execution process of block 304 in the above embodiments, which is not repeated here.

It is to be noted that, when the foreign object completely covers the screen, for example, the foreign object is a book, there is no boundary between the bright region and the dark region in the detection image. For example, when the foreign object is reflective to light, the detection image only includes the bright region, and thus it is impossible to determine the final position and shape of the foreign object attached to the screen. Therefore, the prompt information may be provided to the user in the form of text and voice broadcast to provide the specific position of the electronic device to the user, so that the foreign object may be removed in time by the user.

With the method for detecting a foreign object according to embodiments of the disclosure, the reference image is compared with the detection image to determine the similarity degree between the reference image and the detection image. The reference image is captured by the image sensor when there is no foreign object on the screen. It is determined whether a foreign object is on the screen based on the similarity degree between the reference image and the detection image. It may be accurately recognized whether a foreign object is attached to the screen, such that the foreign object may be removed in time by the user to avoid the screen from being damaged.

It may be understood that, when the screen emits light, not all light can pass through the display screen. For example, due to the influence of signal wiring and storage capacitors for the driver chip of the display screen, these places are completely opaque. Therefore, the detection image captured by the image sensor may include some textures or lines. For example, when data wires of the screen are interleaved and scan wires of the screen are interleaved, a grid texture may be presented in the detection image captured by the image sensor.

Therefore, in embodiments of the disclosure, in order to reduce the computation amount and improve the accuracy of determination result of the boundary, on the basis of the above embodiments, the grid texture of the detection image may be removed before identifying the boundary between the bright region and the dark region in the detection image. The grid texture is formed from the interleaved data wires of the screen.

In order to implement the above embodiments, the disclosure further provides an apparatus for detecting a foreign object.

Figure 8:
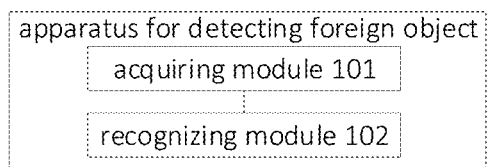
FIG. 8 is a schematic diagram illustrating a structure of an apparatus for detecting a foreign object according to a fifth embodiment of the disclosure.

FIG. 8 is a schematic diagram illustrating an apparatus for detecting a foreign object according to a fifth embodiment of the disclosure.

In embodiments of the disclosure, the apparatus for detecting a foreign object is configured to detect whether a foreign object is attached to a screen of an electronic device. An image sensor is provided below the screen of the electronic device.

As illustrated in FIG. 8, the apparatus for detecting a foreign object includes an acquiring module 101 and a recognizing module 102.

The acquiring module 101 is configured to acquire a detection image captured by an image sensor.

The recognizing module 102 is configured to detect whether a foreign object is attached to the screen based on the detection image.

As a possible implementation, the electronic device is foldable. The screen includes a first display region and a second display region that are rotatable with respect to each other. When the electronic device is in a folding state, the first display region faces towards the second display region.

As a possible implementation, the electronic device further includes an under-screen fingerprint module. The under-screen fingerprint module includes a fingerprint image sensor. The image sensor is the fingerprint image sensor.

In embodiments of the disclosure, the recognizing module 102 is further configured to identify a boundary between a bright region and a dark region in the detection image. Brightness of the bright region is higher than the brightness of the dark region. When a closed region is enclosed by the boundary, and/or, when two endpoints of the boundary are at the edge of the detection image, it is determined that a foreign object is attached to the screen.

In embodiments of the disclosure, the recognizing module 102 is further configured to compare a reference image with the detection image to determine a similarity degree between the reference image and the detection image. The reference image is captured by the image sensor when no foreign object is attached to the screen. When the similarity degree is greater than or equal to a similarity degree threshold, it is determined that no foreign object is attached to the screen.

When the similarity degree is less than the similarity degree threshold, it is determined that there is a foreign object on the screen.

In embodiments of the disclosure, the recognizing module 102 is further configured to, when the similarity degree is less than the similarity degree threshold, recognize the boundary between the bright region and the dark region in the detection image, to recognize the foreign object based on the boundary.

In embodiments of the disclosure, the recognizing module 102 is further configured to compare brightness of a pixel of the detection image with brightness of an adjacent pixel; mark the pixel as a target pixel based on a brightness difference between the brightness of the pixel and the brightness of at least one adjacent pixel being greater than a threshold; and obtain the boundary by connecting adjacent two target pixels.

Figure 9:
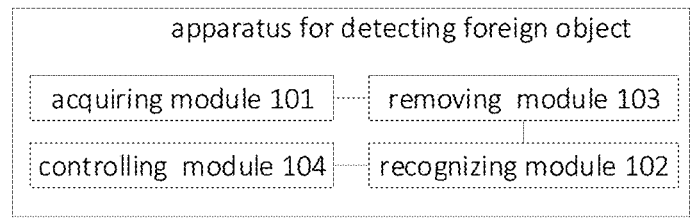
FIG. 9 is a schematic diagram illustrating a structure of an apparatus for detecting a foreign object according to a sixth embodiment of the disclosure.

Further, in a possible implementation of embodiments of the disclosure, as illustrated in FIG. 9, on the basis of the embodiments as illustrated in FIG. 8, the apparatus for detecting a foreign object may further include a removing module 103 and a controlling module 104.

The removing module 103 is configured to remove a grid texture from the detection image before recognizing the boundary between the bright region and the dark region in the detection image. The grid texture is formed from interleaved data wires of the screen.

The controlling module 104 is configured to control the screen to display prompt information indicating that there is a foreign object on the screen after determining that there is a foreign object on the screen. The prompt information includes a graphic prompt for marking the boundary.

In embodiments of the disclosure, the controlling module 104 is further configured to determine an area of a first closed region, in response to the first closed region being enclosed by the boundary; determine an area of a second closed region in response to the second closed region is enclosed by the boundary and one or more edges of the image; control the screen to display prompt information indicating that there is a foreign object on the screen when the area of the first closed region or the area of the second closed region is greater than an area threshold.

It is to be noted that the foregoing explanation of the embodiments of a method for detecting a foreign object is also applied to an apparatus for detecting a foreign object in embodiments, which is not repeated here.

With the apparatus for detecting a foreign object according to embodiments of the disclosure, it is detected whether a foreign object is attached to the screen based on the detection image captured by the image sensor. Therefore, it may be recognized whether there is a foreign object on a screen, so that the foreign object may be removed in time by the user to avoid the screen from being damaged.

In order to achieve the above embodiments, the disclosure further provides an electronic device. The electronic device includes an image sensor arranged below a screen of the electronic device. The electronic device further includes a memory, a processor and a computer program stored on the memory and executable on the processor. The processor is electrically connected to the image sensor and the screen. The processor is configured to run the computer program to execute the method for detecting a foreign object according to the above embodiments of the disclosure.

In embodiments of the disclosure, it may be accurately identified whether there is a foreign object on the screen of a foldable electronic device based on the detection image. For the foldable electronic device, the screen includes a first display region and a second display region that are rotatable with respect to each other. When the electronic device is in a folding state, the first display region faces towards the second display region.

In detail, when there is a foreign object on the screen, for example, a foreign object is attached to the first display region, the second display region, and/or, an overlapping portion between the first display region and the second display region, the first display region, the second display region, and/or the overlapping portion between the first display region and the second display region will have a corresponding representation which will be reflected in the detection image. Therefore, in the disclosure, it may be detected whether there is a foreign object on the screen of the foldable electronic device based on the detection image.

In embodiments of the disclosure, the detection image may be captured based on the full-screen optical fingerprint. For example, as illustrated in FIG. 3, the optical fingerprint module may include a cover glass 31, a touch pad and a screen 32, a fingerprint image sensor 33, and an Olens 34. The basic working principle of the optical fingerprint module may be as follows. The screen of the electronic device emits light 01. The light 01 is reflected by a superficial texture of a finger 02 of the user to cause a difference which can be imaged by the fingerprint image sensor 33 provided below the screen. Therefore, in the disclosure, it can be determined whether there is a foreign object attached on the screen based on the detection image captured by the fingerprint image sensor 33.

It is to be understood that, it can be determined whether there is a foreign object is attached on the screen through an ultrasound fingerprint module or a capacitive fingerprint module, which is not limited here.

Therefore, in embodiments of the disclosure, the electronic device may include an under-screen fingerprint module. The under-screen fingerprint module may include a fingerprint image sensor. The detection image may be captured by the fingerprint image sensor in the under-screen fingerprint module. Therefore, the foreign object can be directly detected by the under-screen fingerprint module without introducing an additional sensor, which may reduce the manufacture cost of the electronic device.

Generally, the duration when the screen is in a folded state by the user is limited. When the screen is in the folding state, only the foreign object attached to the overlapping portion between the first display region and the second display region can increase a probability of damaging the screen. Therefore, in order to improve the efficiency of image recognition, and thus improve the efficiency of the foreign object detection, in the disclosure, when the screen is in the folding state, it may be detected whether a foreign object is attached to the overlapping portion between the first display region and the second display region based on the detection image. Therefore, when the screen is in the folding state, the efficiency of the foreign object detection may be improved.

In embodiments of the disclosure, the under-screen fingerprint module may be arranged within a part of the first display region, where the part of the first display region is overlapped with the second display region when the electronic device is folded, and/or within a part of the second display region where the part of the second display region is overlapped with the first display region when the electronic device is folded. The detection image corresponding to the overlapping portion between the first display region and the second display region may be directly captured by the fingerprint image sensor of the under-screen fingerprint module.

Figure 10:
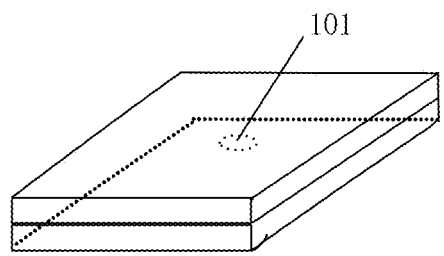
FIG. 10 is a schematic diagram illustrating a structure of an electronic device according to a seventh embodiment of the disclosure.

As an example, as illustrated in FIG. 10, when a display area of the first display region is the same with a display area of the second display region, the under-screen fingerprint module 101 may be arranged within the first display region and/or the second display region. The under-screen fingerprint module arranged within the first display region may be configured to detect a foreign object on the screen corresponding to the first display region. The under-screen fingerprint module arranged within the second display region may be configured to detect a foreign object on the screen corresponding to the second display region. Therefore, the detection image corresponding to the overlapping portion between the first display region and the second display region may be directly captured by the under-screen fingerprint module.

Figure 11:
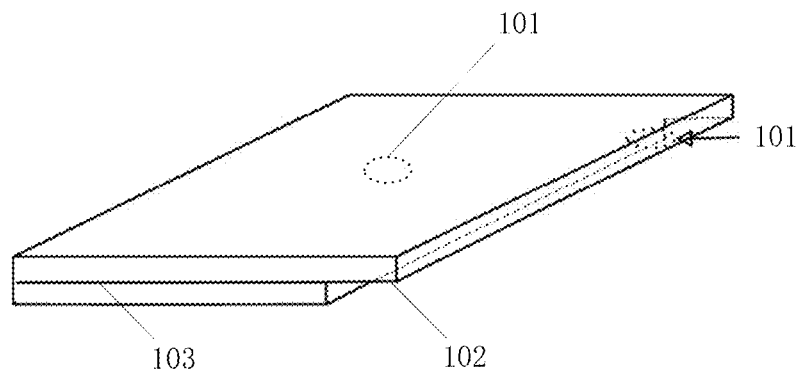
FIG. 11 is a schematic diagram illustrating a structure of an electronic device according to an eighth embodiment of the disclosure.

It is to be noted that, in practical applications, the display area of the first display region may be different from the display area of the second display region. For example, as illustrated in FIG. 11, the display area of the first display region 102 is greater than the display area of the second display region 103. In order to capture the detection image corresponding to the overlapping portion between the first display region and the second display region, in the disclosure, the under-screen fingerprint module 101 may be arranged within a part of the first display region, where the part of the first display region is overlapped with the second display region when the electronic device is folded, and/or in a part of the second display region where the part of the second display region is overlapped with the first display region when the electronic device is folded.

In addition, in order to prevent the electronic device from being damaged by the foreign object, the detection image corresponding to a non-overlapping portion between the first display region and the second display region is also captured. In this case, an under-screen fingerprint module can be arranged within the non-overlapping portion between the first display region and the second display region. That is, the under-screen fingerprint module is arranged within a part of the first display region where the part of the first display region is not overlapped with the second display region when the electronic device is folded, and/or within a part of the second display region where the part of the second display region that is not overlapped with the first display region when the electronic device is folded.

For example, as illustrated in FIG. 11, an under-screen fingerprint module 101 can be arranged within the non-overlapping portion between the first display region and the second display region.

It may be understood that, FIG. 10 and FIG. 11 are only examples to illustrate the arrangement of the under-screen fingerprint module in the disclosure, which are not construed as a limitation of the disclosure. In practical applications, in order to ensure the accuracy of the foreign object detection, a respective under-screen fingerprint module can be arranged with each display region to ensure that the foreign object detection can be realized for each display region.

In order to implement the above embodiments, the disclosure further provides a computer readable storage medium having one or more computer programs stored thereon. When the one or more computer programs are executed by a processor, a method for detecting a foreign object as described above is executed.

In order to achieve the above embodiments, the disclosure further provides a computer program product. When instructions in the computer program product are executed by a processor, a method for detecting a foreign object as described above is executed.

In descriptions of the specification, descriptions with reference to terms "one embodiment", "some embodiments", "examples", "specific examples" or "some examples" etc. mean specific features, structures, materials or characteristics described in conjunction with the embodiment(s) or example(s) are included in at least one embodiment or example of the disclosure. In this specification, the schematic representations of the above terms do not have to be the same embodiment or example. Moreover, specific features, structures, materials or characteristics described may be combined in any one or more embodiments or examples in a suitable manner. In addition, those skilled in the art may combine different embodiments or examples and characteristics of different embodiments or examples described in this specification without contradicting each other.

In addition, the terms "first" and "second" used in the disclosure are only used for description purpose, and may not be understood as implying or indicating relative importance of or the number of technical features indicated by these terms. Therefore, features limited by "first" and "second" may explicitly or implicitly include at least one of the features. In the description of the disclosure, "multiple" means at least two, for example two, three, etc., unless otherwise specified.

Any process or method descriptions described in the flowchart or in other ways herein may be understood as a module, a segment or a part of a code including one or more executable instructions configured to implement blocks of customized logical functions or processes, and scopes of embodiments of the disclosure include additional implementations, which may include implement functions not be in the order shown or discussed including the substantially simultaneous manner according to functions involved or in reverse order, which should be understood by those skilled in the art of embodiments of the disclosure.

The logic and/or blocks represented in the flowchart or described in other ways herein, for example, may be considered as an ordered list of an executable instruction configured to implement logic functions, which may be specifically implemented in any computer readable medium, for use by an instruction execution system, an apparatus or a device (such as a computer-based system, a system including a processor, or other systems that may obtain and execute instructions from an instruction execution system, an apparatus or a device) or in combination with the instruction execution systems, apparatuses or devices. A "computer readable medium" in this specification may be an apparatus that may contain, store, communicate, propagate or transmit a program for use by an instruction execution system, an apparatus or a device or in combination with the instruction execution systems, apparatuses or devices. A more specific example of a computer readable medium (a non-exhaustive list) includes the followings: an electronic connector (an electronic apparatus) with one or more cables, a portable computer disk box (a magnetic device), a random access memory (RAM), a read-only memory (ROM), an erasable programmable read-only memory (an EPROM or a flash memory), an optical fiber device, and a portable optical disk read-only memory (CDROM). In addition, a computer readable medium even may be paper or other suitable medium on which a program may be printed, since paper or other medium may be optically scanned, and then edited, interpreted or processed in other suitable ways if necessary to obtain a program electronically and store it in a computer memory.

It should be understood that all parts of the disclosure may be implemented with a hardware, a software, a firmware and their combination. In the above implementation, multiple blocks or methods may be stored in a memory and implemented by a software or a firmware executed by a suitable instruction execution system. For example, if implemented with a hardware, they may be implemented by any of the following techniques or their combination known in the art as in another implementation: discrete logic circuit with logic gate circuits configured to achieve logic functions on data signals, a special integrated circuit with appropriate combined logic gate circuits, a programmable gate array (PGA), a field programmable gate array (FPGA), etc.

Those skilled in the art may understand that all or part of blocks in the above embodiments may be implemented by a program to instruct relevant hardware, in which the program may be stored in a computer readable storage medium including one or combination of blocks in embodiments of the method when executing.

In addition, functional units in embodiments of the disclosure may be integrated in a processing module, or may be physically existed separately, or two or more units may be integrated in a module. The above integrated module may be implemented in the form of a hardware or in the form of a software functional module. The integrated module may be stored in a computer readable storage medium if it is implemented in the form of a software functional module and sold and used as an independent product.

The foregoing storage medium may be a read-only memory, a magnetic disk or a compact disc, etc. It should be understood that, notwithstanding the embodiments of the disclosure are shown and described above, the above embodiments are exemplary in nature and shall not be construed as a limitation of the disclosure. Those skilled in the art may change, modify, substitute and vary the above embodiments within the scope of the disclosure.

What is claimed is:

1. A method for detecting a foreign object, for an electronic device including a screen and an image sensor arranged below the screen, the method comprising:
    acquiring a detection image captured by the image sensor; and
    detecting whether a foreign object is attached on the screen based on the detection image comprising:
        acquiring brightness of each pixel in the detection image;
        marking a pixel of the detection image as a target pixel in response to a brightness difference between brightness of the pixel and brightness of at least one adjacent pixel of the pixel being greater than a threshold;
        obtaining a boundary between a bright region and a dark region in the detection image by connecting adjacent two target pixels, wherein brightness of the bright region is higher than brightness of the dark region; and
        determining a shape of the foreign object, a position of the foreign object on the screen or both the shape and the position based on a closed region enclosed by the boundary, one or more edges of the detection image where two endpoints of the boundary are located, or both the closed region and the one or more edges.

2. The method of claim 1, wherein detecting whether a foreign object is attached on the screen based on the detection image comprises:
    determining a similarity degree between a reference image and the detection image; the reference image being captured by the image sensor when no foreign object is attached on the screen;
    determining that no foreign object is attached on the screen based on the similarity degree being greater than or equal to a similarity degree threshold; and
    determining that a foreign object is attached on the screen based on the similarity degree being less than the similarity degree threshold.

3. The method of claim 2, wherein determining the similarity degree comprises:
    extracting a first image feature of the reference image and extracting a second image feature of the detection image, each of the first image feature and the second image feature comprising a contour feature, a color distribution, or both the contour feature and the color distribution; and
    determining the similarity degree between the reference image and the detection image based on the first image feature and the second image feature.

4. The method of claim 3, further comprising:
    identifying the boundary between the bright region and the dark region in the detection image, and identifying the foreign object based on the boundary based on the similarity degree less than the similarity degree threshold.

5. The method of claim 1, further comprising:
    displaying, on the screen, prompt information indicating that a foreign object is attached on the screen.

6. The method of claim 5, wherein displaying the prompt information comprises:
    determining a region area of a first closed region in response to the first closed region being enclosed by the boundary;
    determining a region area of a second closed region in response to the second closed region being enclosed by the boundary and one or more edges of the detection image; and
    displaying the prompt information in response to the region area of the first closed region or the region area of the second closed region being greater than an area threshold.

7. The method of claim 1, further comprising:
    removing a grid texture from the detection image; the grid texture being formed by interleaved data wires of the screen.

8. The method of claim 1, wherein, the screen of the electronic device is foldable, the screen comprises a first display region and a second display region, the first display region and the second display region being rotatable with respect to each other, and
    the first display region facing towards the second display region when the electronic device is in a folding state.

9. The method of claim 1, wherein the electronic device comprises an under-screen fingerprint module, and the under-screen fingerprint module comprises a fingerprint image sensor;
    the image sensor being the fingerprint image sensor.

10. An electronic device, comprising an image sensor arranged below a screen of the electronic device, a memory, a processor and a computer program stored on the memory and executable on the processor, the processor being electrically connected to the image sensor and the screen;
    wherein the processor is configured to run the computer program to:
        acquire a detection image captured by an image sensor;
        detect whether a foreign object is attached on the screen based on the detection image;

acquire brightness of each pixel in the detection image;
mark a pixel of the detection image as a target pixel in response to a brightness difference between brightness of the pixel and brightness of at least one adjacent pixel of the pixel being greater than a threshold;
obtain a boundary between a bright region and a dark region in the detection image by connecting adjacent two target pixels, wherein brightness of the bright region is higher than brightness of the dark region; and
determine a shape of the foreign object, a position of the foreign object on the screen or both the shape and the position based on a closed region enclosed by the boundary, one or more edges of the detection image where two endpoints of the boundary are located, or both the closed region and the one or more edges.

11. The electronic device of claim 10, wherein the screen of the electronic device is foldable, and the screen comprises a first display region and a second display region, the first display region and the second display region being rotatable with respect to each other;
when the electronic device is in a folding state, the first display region facing towards the second display region;
the electronic device further comprises an under-screen fingerprint module, and the under-screen fingerprint module comprises a fingerprint image sensor;
the image sensor being the fingerprint image sensor.

12. The electronic device of claim 11, wherein, the under-screen fingerprint module is arranged within a part of the first display region, a part of the second display region, or both the part of the first display region and the part of the second display region, the part of the first display region being overlapped with the second display region when the electronic device is folded, and the part of the second display region being overlapped with the first display region when the electronic device is folded.

13. An electronic device, comprising a foldable screen and an image sensor arranged below the screen, the screen comprises a first display region and a second display region, the first display region and the second display region being rotatable with respect to each other; the first display region facing towards the second display region when the electronic device is in a folding state, the electronic device further comprising a memory, a processor and a computer program stored on the memory and executable on the processor, the processor being electrically connected to the image sensor and the screen, wherein the processor is configured to run the computer program to:
acquire a detection image captured by an image sensor;
detect whether a foreign object is attached on the screen based on the detection image;
acquire brightness of each pixel in the detection image;
mark a pixel of the detection image as a target pixel in response to a brightness difference between brightness of the pixel and brightness of at least one adjacent pixel of the pixel being greater than a threshold;
obtain a boundary between a bright region and a dark region in the detection image by connecting adjacent two target pixels, wherein brightness of the bright region is higher than brightness of the dark region; and
determine a shape of the foreign object, a position of the foreign object on the screen or both the shape and the position based on a closed region enclosed by the boundary, one or more edges of the detection image where two endpoints of the boundary are located, or both the closed region and the one or more edges.

14. The electronic device of claim 13, wherein, the electronic device further comprises an under-screen fingerprint module, and the under screen-fingerprint module comprises a fingerprint image sensor;
the image sensor being the fingerprint image sensor.

15. The electronic device of claim 14, wherein, the under-screen fingerprint module is arranged with a part of the first display region, a part of the second display region, or both the part of the first display region and the part of the second display region, the part of the first display region being overlapped with the second display region when the electronic device is folded, and the part of the second display region being overlapped with the first display region when the electronic device is folded.

* * * * *